No. 794,327. PATENTED JULY 11, 1905.
H. H. TOMLINSON.
POTATO CUTTER.
APPLICATION FILED JULY 12, 1904.
3 SHEETS—SHEET 1.
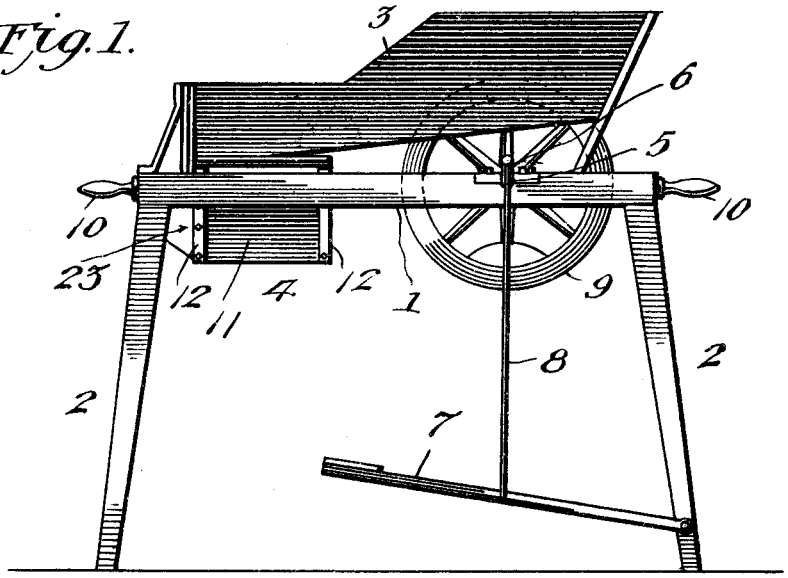
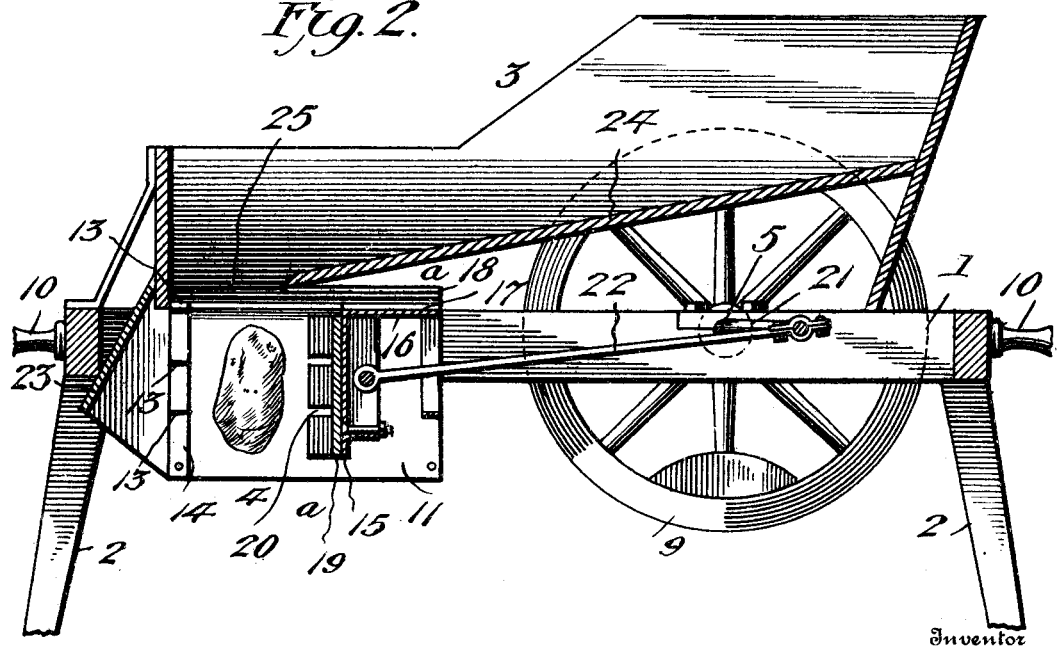
Witnesses
Geo. Ackman Jr.
H. P. Hollingsworth
Inventor
Henry H. Tomlinson,
By Victor J. Evans
Attorney No. 794,327. PATENTED JULY 11, 1905.
H. H. TOMLINSON.
POTATO CUTTER.
APPLICATION FILED JULY 12, 1904.
3 SHEETS—SHEET 2.
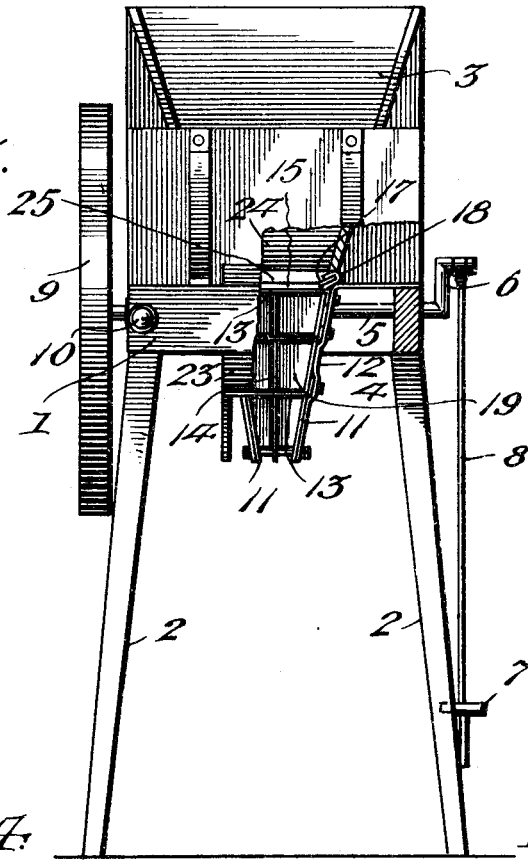
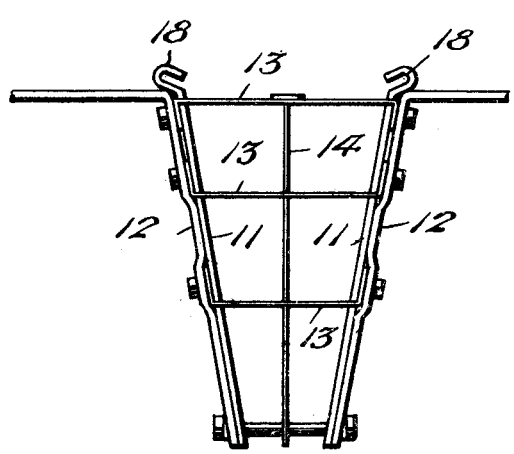
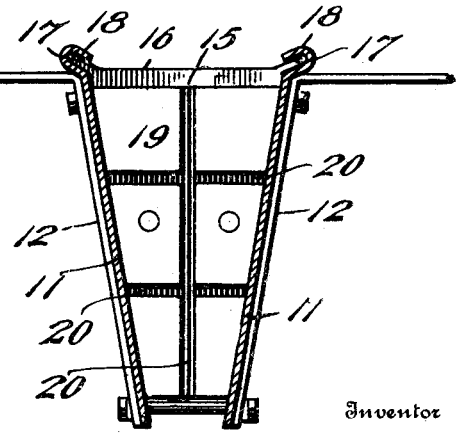
Witnesses
Inventor
Henry H. Tomlinson,
By Victor J. Evans
Attorney No. 794,327. PATENTED JULY 11, 1905.
H. H. TOMLINSON.
POTATO CUTTER.
APPLICATION FILED JULY 12, 1904.

3 SHEETS—SHEET 3.

Witnesses
Geo. Ackman Jr.
H. P. Hollingsworth

Inventor
Henry H. Tomlinson,
By Victor J. Evans
Attorney

No. 794,327.

Patented July 11, 1905.

UNITED STATES PATENT OFFICE.

HENRY HARRISON TOMLINSON, OF HEMINGFORD, NEBRASKA.

POTATO-CUTTER.

SPECIFICATION forming part of Letters Patent No. 794,327, dated July 11, 1905.

Application filed July 12, 1904. Serial No. 216,237.

*To all whom it may concern:*

Be it known that I, HENRY HARRISON TOMLINSON, a citizen of the United States, residing at Hemingford, in the county of Box butte and State of Nebraska, have invented new and useful Improvements in Potato-Cutters, of which the following is a specification.

This invention relates to a vegetable-cutting machine especially adapted for cutting seed-potatoes. As is well known, potatoes when in condition for seed have a number of buds on their surface from each of which a plant may be grown. These buds are in sufficient number on each potato to permit the latter being cut into pieces with the assurance that each piece will contain one or more buds. Careful selection and hand-cutting may be therefore dispensed with and a machine, such as will be hereinafter described and claimed, substituted. Also by the use of a machine a large number of potatoes can be prepared for planting in a short while and at slight expense. The cutting-machine, the subject of the present invention, is simple in construction and operation, of few parts, and not liable to become disarranged by unskilled operators.

Figure 6:
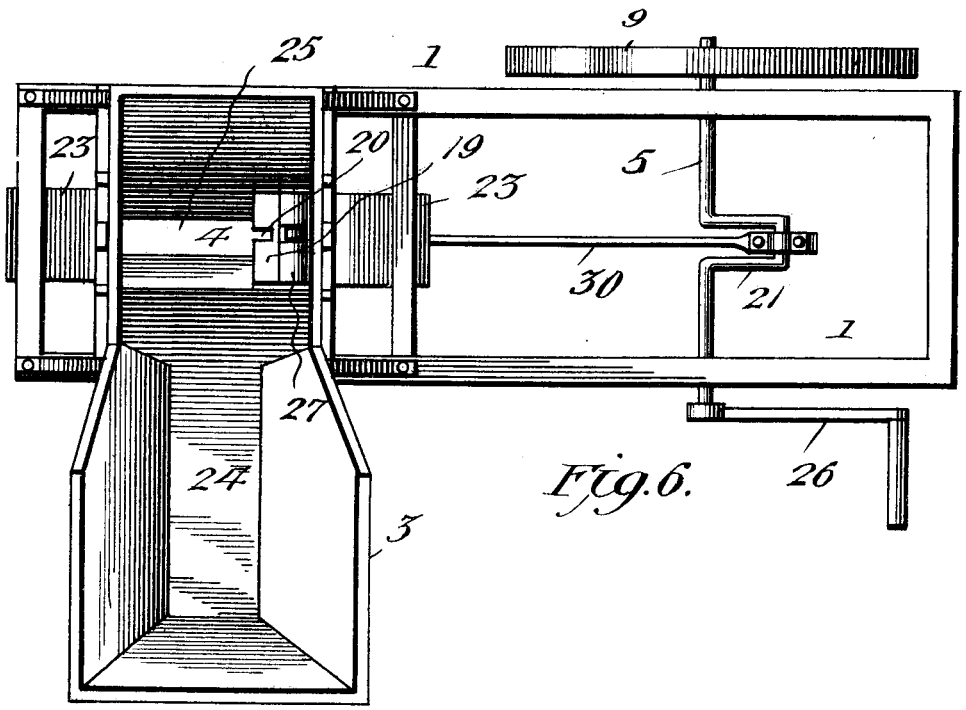
Figure 7:
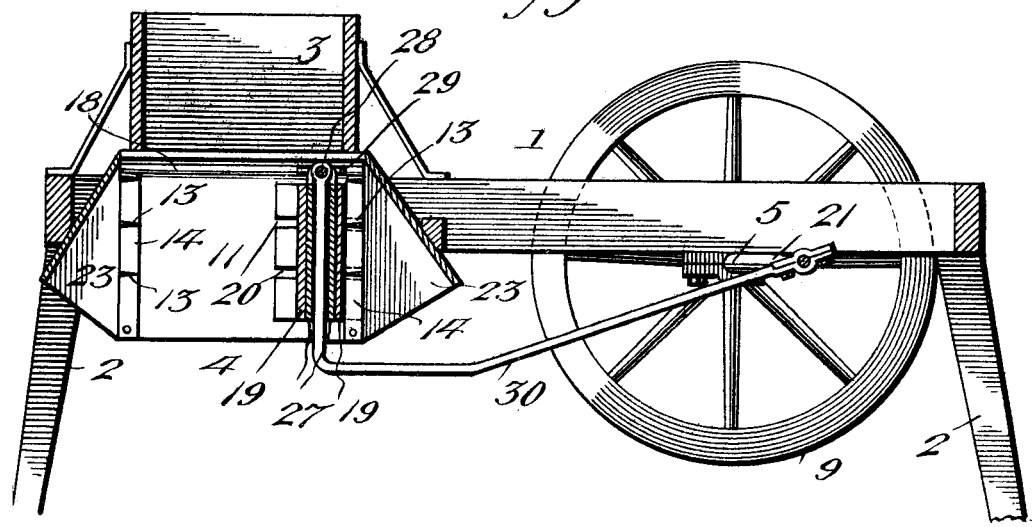

In the accompanying drawings, Figure 1 represents a side elevation of a vegetable-cutting machine constructed in accordance with this invention. Fig. 2 is a longitudinal sectional view of the same enlarged. Fig. 3 is an end view of the machine looking in the direction of the arrow A, Fig. 1. Fig. 4 is an enlarged view of the cutters. Fig. 5 is an enlarged cross-sectional view on the line *a a*, Fig 2. Fig. 6 is a plan view of a modified form of the machine arranged with double cutting devices. Fig. 7 represents a longitudinal section of the machine illustrated by Fig. 6.

Similar numerals of reference indicate corresponding parts in all the figures.

The numeral 1 indicates a frame of rectangular shape upheld on legs 2 and supporting a longitudinally-disposed hopper 3. At one end of the frame 1 and below the delivery end of the hopper is secured the cutting mechanism 4, while near the opposite end of said frame is journaled a cross-shaft 5, on one end of which is a crank 6. Journaled at one end to one of the legs 2 and projecting inwardly therefrom is a treadle 7, from which a connecting-rod 8 extends upwardly to the crank 6 on the shaft 5, which latter carries on its opposite end a fly-wheel 9.

10 indicates handles on the ends of the frame 1, by means of which the machine is carried from place to place.

The cutting mechanism 4 comprises two inclined side plates 11, more widely separated at their upper than their lower edges and reinforced by strap-pieces 12, bolted at each end to the plates 11, the whole forming a trough to hold the vegetables to be cut. The upper ends of the strap-pieces 12 are bent laterally (see Figs. 3 and 5) and fastened to the side beams of the frame 1 to hold the plates 11 in fixed position. To the forward ends of the plates 11 are attached a series of horizontally-disposed cutters or knives 13 and one or more vertical cutters 14, which divide into several pieces vegetables forced against them by any means.

The numeral 15 indicates a plunger which in this instance is formed of a vertically-disposed plate bent rearwardly at its top to prevent vegetables from falling behind the plunger as it is moved toward the cutters. The bent top 16 has its ends 17 inclined upwardly to slide in horizontal guides 18, formed by turning the upper ends of the plates 11 into suitable shape, as clearly shown in Figs. 3, 4, and 5. Fixed to the forward face of the plunger 15 is a block 19, preferably of wood, in which are cut horizontal grooves 20, corresponding in number and position to the knives 13 and 14 and having a depth equal to the width of said knives. A crank 21 on the shaft 5 beneath the hopper imparts a reciprocatory movement to the plunger 15 through the medium of a connecting-rod 22, extending from said crank to a bracket on the back of the plunger. A hood 23 at the front end of the hopper 3 deflects the cut vegetable downwardly. The bottom 24 of the hopper 3 inclines downwardly toward its outlet-opening 25, through which the vegetables pass to the cutting mechanism 4.

In the modified form of the invention illustrated by Figs. 6 and 7 two sets of cutters are used with a single plunger, cutting a vegetable at each forward and backward movement of the plunger. The hopper 3 is placed at a right angle to or across the frame 1 with its outlet, as in the preferred form, above the cutting mechanism 4, and instead of the treadle action for rotating the shaft 5 to reciprocate the plunger a hand-crank 26 is substituted for the crank 6 on said shaft.

The plunger 27 is in this instance formed of a metal plate bent upon itself and fitted to slide to and fro in the trough between the side plates 11. A rod 28 extends across the trough and is provided with flattened ends 29, which fit in the guides 18. On this rod 28 the plunger is suspended with its ends reaching downwardly. Each face of the pusher carries a block 19, which blocks coöperate with knives 13 and 14 at each end of the trough.

Motion is imparted to the plunger by means of the crank 21 on the shaft 5 through connecting-rod 30, pivoted to said crank and passing up between the two sides of the plunger 27 to the cross-rod 28, on which it is journaled. Hoods 23 similar to that used on the preferred machine are provided at each end of the cutting mechanism and for the same purpose.

When vegetables—such as seed-potatoes, for which this invention is more particularly designed—are emptied into the hopper 3, they are fed downward by hand to the outlet 25, through which they fall one at a time into the trough of the cutting mechanism. At the same time that potatoes are fed to the cutting mechanism the shaft 5 is rotated by the treadle and the plunger 19 reciprocated to and from the knife, which as the plunger moves in a forward direction pushes a potato, should there be one in the trough, against the knives 14 and 13, cutting it into a number of parts. The face of the block 19, it will be remembered, is divided into sections by the grooves 20 in such manner that a section is opposite each space formed by the knives. From this disposition of the sections it follows that after the potato has been cut into parts by the knives the sections on the block will pass through the spaces between the knives and positively force the parts of the potato from the machine, which, directed by the hood 23, fall to the floor or ground or into a receptacle placed in position to receive them.

In the modified form of the machine a potato is cut at each reciprocation of the plunger, the operator using one hand to feed the potatoes and the other to turn the crank. A hand-crank is considered superior to a treadle with the double-cutter machine, as power has to be applied to the plunger at each movement, whereas in the single machine no work is performed during the return of the plunger. Instead of a treadle or hand-crank power may be used for operating the machine.

Having thus described the invention, what is claimed as new is—

1. In a vegetable-cutter, a frame, a pair of plates spaced to form a trough and having their upper edges folded to produce guideways, means for attaching the plates to the frame, a plurality of spaced knives arranged in the trough, a plunger mounted for reciprocation in the latter and having projections engaging the guideways to guide the plunger in its movements, said plunger being provided with recesses for the reception of and projections to enter the spaces between the knives, and means for reciprocating the plunger.

2. In a vegetable-cutter, a frame, a pair of spaced downwardly-convergent plates attached thereto and constituting a trough, a plurality of spaced knives fixed within the trough, said plates having their upper edges folded to produce longitudinal guideways, a plunger mounted for reciprocation longitudinally of the trough and having projections to enter the guideways, a hopper communicating with and adapted for delivering material into the trough between the knives and plunger, means for reciprocating the latter, said plunger being provided with recesses for the reception of and projections to enter the spaces between the knives, and a downwardly and outwardly inclined hood sustained at the end of the trough in advance of the knives.

In testimony whereof I affix my signature in presence of two witnesses.

HENRY HARRISON TOMLINSON.

Witnesses:
E. L. EVERETT,
W. M. FOSKET.